United States Patent Office 3,011,515
Patented Dec. 5, 1961

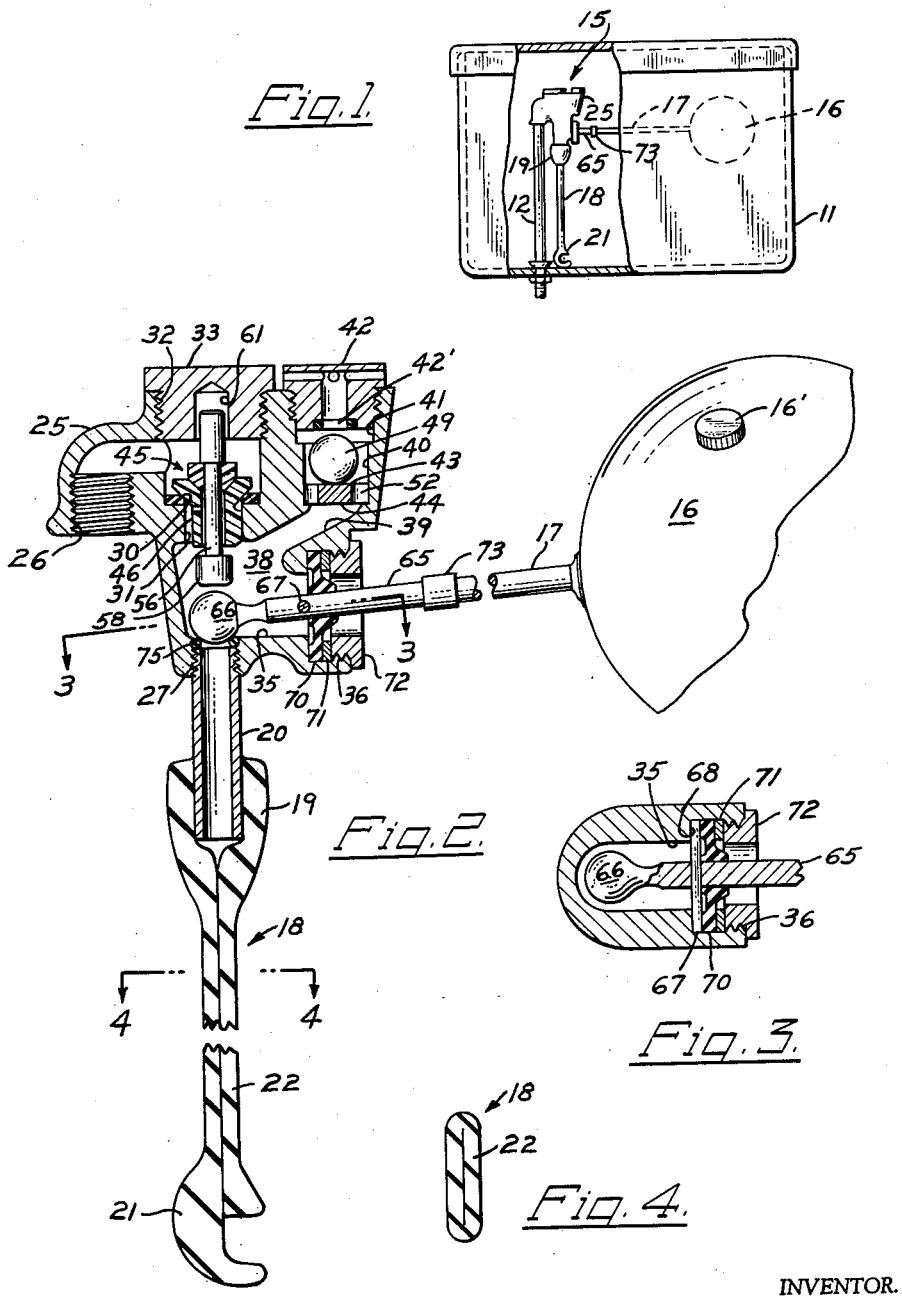

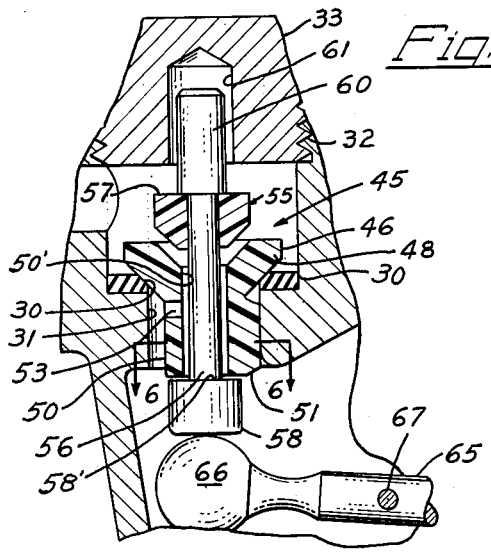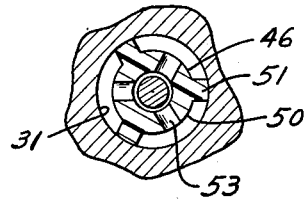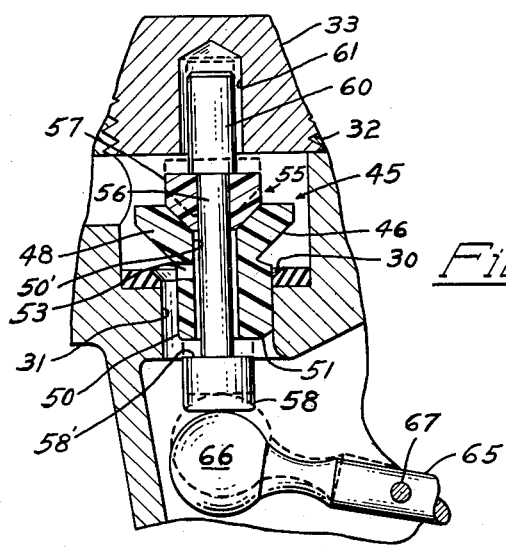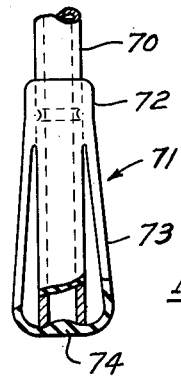

3,011,515
BALL COCK-TYPE VALVE
Cut Kravagna, 419 Kansas St., El Segundo, Calif.
Filed Aug. 11, 1958, Ser. No. 754,476
3 Claims. (Cl. 137—411)

This invention has to do generally with ball cock valves commonly used in water closets in which the valve is operated by the water in a tank by means of a float responsive to the water level.

An object of the invention is to provide a novel valve which is particularly designed for use at a ball cock wherein the valve is operated by a float in a tank of water or other liquid but which also is suitable for use in other installations.

Another object is to provide a novel construction embodying a valve having two main valve elements adapted to open and close sequentially in a manner to preclude a sudden rise or fall of pressure in the pipe controlled by the valve.

Another object is to provide a valve in which an auxiliary fluid chamber is provided on the downstream side of the main valve seat and valve member together with means for causing fluid pressure to rise in the chamber during operation of the valve and thereby provide a cushioning body against which the valve gradually closes, thereby to minimize noise caused by flow of water and eliminate sudden closure and the resultant water hammer.

A further object is to provide an actuating lever which also serves in conjunction with the valve body as an auxiliary valve member to provide an auxiliary closure and to provide restriction means for causing a build-up of pressure in the chamber beneath the valve element during closing thereof.

A still further object is to provide a construction wherein the parts are readily accessible for servicing and in which the movable parts may be easily replaced by an unskilled person.

These and other objects will be apparent from the drawings and the following description. Referring to the drawings:

FIG. 1 is a sectional elevational view of a water closet tank showing a valve embodying the invention mounted therein;

FIG. 2 is a sectional elevational view of a valve member embodying the invention and provided with a special discharge conduit;

FIG. 3 is a sectional view on line 3—3 of FIG. 2;

FIG. 4 is a sectional view on line 4—4 of FIG. 2;

FIG. 5 is an enlarged fragmentary sectional elevational view in the plane of FIG. 2 showing the valve partially open;

FIG. 6 is a fragmentary cross-sectional view on line 6—6 of FIG. 5;

FIG. 7 is a view similar to FIG. 5, but showing the valve in further open position; and FIG. 8 is a fragmentary sectional view of a means for controlling discharge of liquid from the valve.

More particularly describing the invention, in FIG. 1 I show a tank 11 of a conventional water closet with a water supply pipe 12 extending vertically therein. The latter carries the valve of the invention designated generally by 15. In the particular environment shown the valve is actuated by the conventional float 16 on a rod 17 connected to the valve. Numeral 18 designates a special type of water discharge tube or conduit made of a resilient material such as rubber and designed to offer some resistance to the flow of fluid therethrough and to provide a quiet discharge of water into the tank. This has an upper bell end 19 which fits over and may be molded to the outlet nipple 20 of the valve and a foot portion 21 at its other end. Between its ends the main portion 22 of the conduit is formed flat, or collapsed, as shown in FIG. 4 so that it must be flexed to tubular shape by the fluid passing through it. The foot acts as a deflector to quiet the discharge of water into the tank.

The valve itself comprises a valve body 25 having a threaded inlet opening 26 which receives the water supply pipe 12 and a threaded outlet opening 27 in which is mounted the nipple 20. Between these openings the valve is hollow and provided with a seat 30 and a cylindrical passageway 31. The valve body is normally adapted to be installed in upright position as shown in the drawings and the upper part of the body is provided with an opening 32 into which is threaded a plug 33. The body has an opening 35 at the side, and this includes a counterbore 36 which is threaded for a portion of its length. The opening 35 is closed by means to be described later.

Between the cylindrical passage 31 and the outlet 27 is a chamber 38. This is vented to the exterior by a passageway 39 terminating in a bore 40 and a partially threaded counterbore 41. An apertured plug 42 is mounted in the counterbore 41 and below this is a ball check valve element 43 which normally rests upon a removable disk 44 having one or more peripheral slots 52, establishing communication to opposite sides thereof. The construction described provides an anti-syphon means, such as required by sanitary building codes. As will later appear, when the main valve is open with consequent fluid pressure in chamber 38, the ball 49 closes the passage 42' through the plug, but at other times the ball drops to the position in which it is shown in FIG. 2.

Mounted in the region of the valve seat 30 is a valve element assembly 45. This assembly has two valve elements, one inside the other. The outer valve element is designated 46, and this is shown as having a shank portion 50 which is received in the bore 31. The upper portion of element 46 flares out in a conoidal wall portion 48 to provide a portion for engaging the valve seat 30. The shank portion 50 of the element is provided with longitudinal ribs 51 which guide it for limited axial movement in the passage 31. This portion is also provided with radial openings 53 for establishing communication between the interior of the element and the exterior between the ribs.

Mounted within the outer valve element is an inner element 55 which comprises a stem 56 carrying an enlargement 57 shaped to seat within the upper inner end portion of the outer element. The valve stem is provided with an enlarged lower end portion 58 below the lower end of the outer part 46. The distance between the upper enlargement 57 and the lower enlargement 58 is greater than the length of bore 50' of element 46, and consequently the inner valve element is mounted for limited axial movement relative to the outer part. Consequently it may be moved to the open position of FIG. 5 from the closed position of FIG. 2 without disturbing the outer part 46. Also, there is ample clearance between the valve stem 56 and the inner wall 50' of element 45 for flow of fluid when this is permitted by the relative position of the parts, as will later appear. The upper portion 60 of the inner valve element is loosely received in a guide bore 61 in plug 33.

The valve assembly is actuated by a rod 65 having a ball-like inner end portion 66 adapted to engage the lower end of the valve stem 56. The rod is pivotally mounted upon a pin 67 mounted in slots 68 extending axially beyond the inner end of the counterbore 35. The rod extends through a resilient diaphragm member 70 which is mounted in the counterbore 35 and retained by a washer 71 and gland 72. Any suitable joint 73 is provided between the outer end of the rod 65 and an external actuating member, such as the rod 17 of float 16.

When the rod 65 is in the position of FIG. 2, the inner end of the rod engages an O-ring valve seat 75 and acts as a valve element to close the outlet passage through the nipple 20. This in effect forms a supplemental closure for the valve.

In the operation of the valve, when the outer end of lever 65 is depressed, as by the float 16 following the water level downwardly in the tank 11, the inner end portion 66 rises and engages the lower end portion 58 of the valve stem 56 raising this and its valve element 57 to the position shown in FIG. 5, thereby providing a limited or restricted passage through the valve for flow of water. The water flows through the space between the inner and outer valve elements to and then through the openings 53 in the outer element and then downwardly through the cylindrical passage 31 to the outlet. As the lever 65 is further depressed at its outer end, the outer valve element 45 is raised off its seat 30. It has been found that element 45 may rise to the position of FIG. 7 by the force of the water striking the under surface of the conoidal upper portion of the element, although this depends upon the height of the inlet opening. As lever 65 moves further to the broken-line position of FIG. 7, the inner valve element is raised and in some cases this may result in leaving a passage between the two so that in this, the fully open position water often flows between the valves as well as around the outer valve element. In other cases, the element 46 will rise with the inner valve element, depending upon local pressures and the configuration of the parts and the relative height of the liquid inlet to the valve chamber.

When the valve first opens pressure builds up in chamber 38 due to the resistance to flow of water offered by the restricted outlet which includes the collapsed resilient tube 18. The pressure in this chamber remains above atmospheric until after the valve has completely closed, thereby serving to quiet the flow of water and to act as a cushion against which the valve elements ultimately close.

The float 16 should be made sufficiently heavy to substantially more than just overcome the water pressure exerted against the valve member 45. Preferably, the float is weighted somewhat, and this can readily be done by providing a capped opening, designated 16', through which water can be added as required. This also enables the adjustment of the weight of the float to the conditions of the particular installation.

In the closing action of the valve, initially as the inner end of the rod 65 descends the inner and outer parts of the valve descend together until the outer element 45 suddenly drops away from the inner element portion 57 and seats against seat 30. The water still is able to escape to a lesser extent as when the inner element of the valve was initially raised. As the rod 65 returns to its original or normal position, the end 66 thereof tends to restrict the outlet with the result that pressure is further built up in chamber 38 so that the differential of pressure between this chamber and the inlet side of the valve is lessened. Thus, due to this, and the effect of the weighted float on the actuating lever, the final closing movement of the inner valve element is relatively uniform and gradual and, hence, quiet.

It will be apparent that one of the features of the overall assembly lies in the provision of means for placing some restriction or resistance to the flow of liquid from the valve irrespective of the position of the actuating rod 65 to thereby increase the pressure in chamber 38 over that which it would be without any restriction. One way of accomplishing this is by use of a normally collapsed or flattened resilient tube outlet member 18 which requires a certain amount of pressure to expand it sufficiently to permit the flow of liquid therethrough.

In place of the collapsed conduit 18, I may provide a metal pipe or tube 70 (FIG. 8) and fit this with a restriction means 71 in the form of a resilient member comprising an annular upper portion 72 mounted around the tube 70 and provided with four legs 73 which support a closure portion 74 adapted to fit over the lower end of the pipe. It will be apparent that with this construction some pressure of the water is required to force the closure portion away from the end of tube 70. Also, the device acts as a check valve.

While the parts of the valve may be made of conventional materials, I prefer to form the valve element 46 and the portion 57 of valve element 55 of non-metallic material, such as a stiff plastic.

Although I have illustrated and described a preferred form of my invention, I contemplate that various changes and modifications can be made therein without departing from the invention, the scope of which is indicated by the following claims.

I claim:

1. In a valve, a hollow valve body having an inlet and having an outlet spaced from said inlet, means providing a valve seat within said body between said inlet and outlet, said valve body forming a chamber between said seat and said outlet, a valve member mounted in said body for movement toward and away from said seat, and means restricting flow of fluid from the chamber through said outlet, comprising a rigid tube extending from said outlet and a resilient closure for the end of said tube, said closure comprising an annular portion attached to said tube, a plurality of legs extending axially of the tube and a closure portion at the ends of said legs covering the outlet of said tube.

2. For use in a hollow valve body of the type described having an inlet and having an outlet spaced from the inlet with a valve seat between the inlet and outlet, a two-part valve assembly, comprising a tubular outer part having a tubular shank portion provided with external longitudinal ribs, said shank portion being slidably receivable through said valve seat, said outer part having an enlarged end portion at one end of said shank portion of a size to engage said valve seat, said shank portion being apertured between said ribs, said outer part providing a valve seat at its enlarged end, and an inner part including a stem freely receivable through said outer part and defining an annular space therewith, said inner part having an enlargement on said stem at one end beyond the enlarged end of said outer part and adapted to seat against the valve seat provided by said outer part, said inner part having an enlargement at its other end positioned in spaced relation beyond the other end of said outer part when the enlargement at said one end of the stem is seated against said valve seat and adapted to abut said other end of said outer part upon being moved in a direction to unseat the inner part from the outer part.

3. In a valve of the type described, a hollow valve body having an inlet and having an outlet spaced from said inlet, means providing a first valve seat within said body between said inlet and outlet, a two-part valve member in said body normally seated against said seat, said member including an outer part engaging said seat and axially movable with respect thereto toward said inlet, said outer part having an opening therethrough, and an inner part received in said outer part, said outer part having a seat facing upstream and said inner part normally being seated against said last-mentioned seat, said valve member, when closed, being subjected on one side only to the pressure of fluid in said inlet in a direction to close said valve member, and means projecting through said body for moving said inner part and said outer part of said valve member successively off their respective seats, said inner and outer parts cooperating to provide a passage for flow of fluid when said inner part is off its seat, said valve body having a second valve seat between said first valve seat and said outlet through which fluid must pass to reach said outlet, said means for moving the parts of the valve body comprising a lever pivotally mounted in and projecting through said valve body, said lever being formed at its inner end to act as a valve member engageable with said second valve seat and close the passage therethrough when the valve lever is in position whereby the first-named valve member is seated.

References Cited in the file of this patent

UNITED STATES PATENTS

| | | |
|---|---|---|
| 643,906 | Marsh | Feb. 20, 1900 |
| 654,522 | Cowey | July 24, 1900 |
| 990,337 | Charroin | Apr. 25, 1911 |
| 1,376,214 | Mead | Apr. 26, 1921 |
| 1,756,398 | Steensen | Apr. 29, 1930 |
| 1,787,601 | Swanberg | Jan. 6, 1931 |
| 2,051,635 | Coffelder | Aug. 18, 1936 |
| 2,183,740 | Fitch | Dec. 19, 1939 |
| 2,252,078 | Kohlmeyer | Aug. 12, 1941 |
| 2,374,989 | Funk | May 1, 1945 |
| 2,642,747 | Le Van | June 23, 1953 |
| 2,833,302 | Smith | May 6, 1958 |